and Intelligent Systems, vol. 12, No. 4, pp. 270-276" (Year: 2012).*

United States Patent
Hu et al.

(10) Patent No.: US 10,592,956 B2
(45) Date of Patent: Mar. 17, 2020

(54) ADAPTIVE RECOMMENDATION SYSTEM AND METHODS

(71) Applicant: MasterCard International Incorporated, Purchase, NY (US)

(72) Inventors: Po Hu, Norwalk, CT (US); Jean-Pierre Gerard, Croton-on-Hudson, NY (US); Serge Bernard, Danbury, CT (US); Rohit Chauhan, Somers, NY (US)

(73) Assignee: Mastercard International Incorporated, Purchase, NY (US)

( * ) Notice: Subject to any disclaimer, the term of this patent is extended or adjusted under 35 U.S.C. 154(b) by 810 days.

(21) Appl. No.: 14/720,396

(22) Filed: May 22, 2015

(65) Prior Publication Data

US 2016/0343056 A1 Nov. 24, 2016

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0635* (2013.01)

(58) Field of Classification Search
None
See application file for complete search history.

(56) References Cited

U.S. PATENT DOCUMENTS 7,720,720 B1 5/2010 Sharma et al.
7,881,984 B2 * 2/2011 Kane, Jr. ........... G06F 17/30867
705/26.7

(Continued)

FOREIGN PATENT DOCUMENTS

WO 2014143352 A1 9/2014

OTHER PUBLICATIONS

"Qian Gao, A Dynamic Ontology-based Multi-Agent Context-Awareness User Profile Construction Method for Personalized Information Retrieval, Dec. 2012, International Journal of Fuzzy Logic and Intelligent Systems, vol. 12, No. 4, pp. 270-276" (Year: 2012).*

(Continued)

*Primary Examiner* — William J Allen
*Assistant Examiner* — Maria S. P. Heath
(74) *Attorney, Agent, or Firm* — Armstrong Teasdale LLP

(57) ABSTRACT

A computer-implemented method for recommending items for future purchase by a consumer based on the consumer's historical actions is provided. The method is implemented using an adaptive recommendation ("AR") computer device in communication with a memory. The method includes receiving from a recommender server computing device at least one preference vector, storing the at least one preference vector, receiving at least one consumer action including a time aspect, from a candidate consumer, and determining at least one personalized vector based on the at least one preference vector, the at least one consumer action, and the time aspect associated with each of the at least one consumer action. The at least one personalized vector represents at least one future purchase that the candidate consumer will likely conduct. The method also includes displaying at least one recommendation to the candidate consumer based on the at least one personalized vector.

19 Claims, 8 Drawing Sheets

(56) References Cited

U.S. PATENT DOCUMENTS

| | | | |
|---|---|---|---|
| 8,478,338 B2* | 7/2013 | Sudhakar | H04M 1/67 |
| | | | 455/410 |
| 8,751,507 B2 | 6/2014 | Kim et al. | |
| 2008/0222680 A1 | 9/2008 | Murakami | |
| 2011/0302240 A1 | 12/2011 | Saito et al. | |
| 2012/0078725 A1* | 3/2012 | Maitra | G06Q 30/0269 |
| | | | 705/14.66 |
| 2012/0109749 A1* | 5/2012 | Subramanian | G06Q 30/0255 |
| | | | 705/14.53 |
| 2012/0131018 A1 | 5/2012 | Shishido et al. | |
| 2013/0046772 A1* | 2/2013 | Gu | G06F 17/30 |
| 2013/0086082 A1 | 4/2013 | Park et al. | |
| 2013/0173419 A1 | 7/2013 | Farber et al. | |
| 2013/0332470 A1 | 12/2013 | Saito | |
| 2014/0067596 A1* | 3/2014 | McGovern | G06Q 30/02 |
| | | | 705/26.7 |
| 2014/0156411 A1 | 6/2014 | Murgai | |
| 2014/0236879 A1 | 8/2014 | Bolivar et al. | |

OTHER PUBLICATIONS

PCT International Search Report and Written Opinion for related matter PCT/US2016/031432 dated Aug. 16, 2016; 10 pp.

* cited by examiner

ADAPTIVE RECOMMENDATION SYSTEM AND METHODS

BACKGROUND

The field of the disclosure relates generally to methods and system for adaptive merchant recommendations and, more particularly, to methods and system for recommending items for future purchase by a consumer based on the consumer's historical actions.

Consumers today are provided with an increasing number of segments of goods and services that are available, as well as, an increasing number of merchants available in each segment (also known as a category). A segment is a group of merchants offering similar goods or services, such as a dining segment, an electronics segment, an automobile segment, and a clothing segment. For example, in many cities, consumers have hundreds if not thousands of restaurant options to select from in the dining segment when they are ready to eat. Moreover, even when the restaurant options are narrowed by restaurant category or cuisine, there may still be an overwhelmingly large number of restaurant options presented to the candidate consumer.

In some cases, merchants try to predict future purchases that consumers will make and provide tailored recommendations (i.e., advertisements) for those future purchases. For example, some websites will recommend to visitors a new purchase to be made by the visitor. In some cases, these recommendations are based on past purchases made by the candidate consumer or by other website visitors. For example, if other consumers have purchased from merchants A, B, C, and D, while the candidate consumer in questions has made purchases from merchants A, B, and C then these known systems will likely determine that the candidate consumer has a high propensity to purchase from merchant D. However, these known system lack the ability to incorporate a time aspect (i.e., when the purchases occurred and an relative amount of time between purchases), and further require the central server to have access to a customer's personal information. Therefore, these known systems may continue to recommend merchant D for a period of time after the connection between A, B, C, and D is no longer relevant.

BRIEF DESCRIPTION

In one aspect, a computer-implemented method for recommending items for future purchase by a consumer based on the consumer's historical actions is provided. The method is implemented using an adaptive recommendation ("AR") computer device in communication with a memory. The method includes receiving from a recommender server computing device at least one preference vector. The at least one preference vector is based on a plurality of payment transactions from a plurality of cardholders. The method also includes storing in the memory the at least one preference vector, and receiving at least one consumer action including a time aspect from a candidate consumer. The time aspect includes at least when the consumer action occurred. The method further includes determining by the AR computer device at least one personalized vector based on the at least one preference vector, the at least one consumer action, and the time aspect associated with each of the at least one consumer action. The at least one personalized vector represents at least one future purchase that the candidate consumer will likely conduct. Moreover, the method includes displaying at least one recommendation to the candidate consumer based on the at least one personalized vector.

In another aspect, an adaptive recommendation ("AR") computer device used for recommending items for future purchase by a consumer based on the consumer's historical actions is provided. The AR computer device includes a processor communicatively coupled to a memory device. The processor is programmed to receive at least one preference vector from a recommender server computing device. The at least one preference vector is based on a plurality of payment transactions from a plurality of cardholders. The processor is also programmed to store the at least one preference vector, and receive at least one consumer action including a time aspect from a candidate consumer. The time aspect includes at least when the consumer action occurred. The processor is further programmed to determine at least one personalized vector based on the at least one preference vector, the at least one consumer action, and the time aspect associated with each of the at least one consumer action. The at least one personalized vector represents at least one future purchase that the candidate consumer will likely conduct. Moreover, the processor is programmed to display at least one recommendation to the candidate consumer based on the at least one personalized vector.

In yet another aspect, at least one non-transitory computer-readable storage media having computer-executable instructions embodied thereon is provided. When executed by an adaptive recommendation computer device having at least one processor coupled to at least one memory device, the computer-executable instructions cause the processor to receive at least one preference vector from a recommender server computing device. The at least one preference vector is based on a plurality of payment transactions from a plurality of cardholders. The computer-executable instructions also cause the processor to store the at least one preference vector, and receive at least one consumer action including a time aspect from a candidate consumer. The time aspect includes at least when the consumer action occurred. The computer-executable instructions further cause the processor to determine at least one personalized vector based on the at least one preference vector, the at least one consumer action, and the time aspect associated with each of the at least one consumer action. The at least one personalized vector represents at least one future purchase that the candidate consumer will likely conduct. Moreover, the computer-executable instructions cause the processor to display at least one recommendation to the candidate consumer based on the at least one personalized vector.

BRIEF DESCRIPTION OF THE DRAWINGS

FIG. 1 is a schematic diagram illustrating an example multi-party transaction card industry system for enabling payment-by-card transactions in which merchants and card issuers do not need to have a one-to-one special relationship.

FIG. 2 is a simplified block diagram of an example system used for recommending items for future purchase by a candidate consumer based on the consumer's historical actions in accordance with one example embodiment of the present disclosure.

FIG. 3 illustrates an example configuration of a client system shown in FIG. 2, in accordance with one embodiment of the present disclosure.

FIG. 4 illustrates an example configuration of a server system shown in FIG. 2, in accordance with one embodiment of the present disclosure FIG. 5 is a simplified block diagram of an example system used for recommending items for future purchase by the candidate consumer based on the consumer's historical actions in using the system in FIG. 2.

FIG. 6 is a flow diagram illustrating an iterative system for recommending items for future purchase by the consumer based on the consumer's historical actions using the systems shown in FIGS. 2 & 5.

FIG. 7 is a flow chart of a process for recommending items for future purchase by the consumer based on the consumer's historical actions using the systems shown in FIGS. 2 & 5.

FIG. 8 is a diagram of components of one or more example computing devices that may be used in the systems shown in FIGS. 2 & 5.

Figure 1:
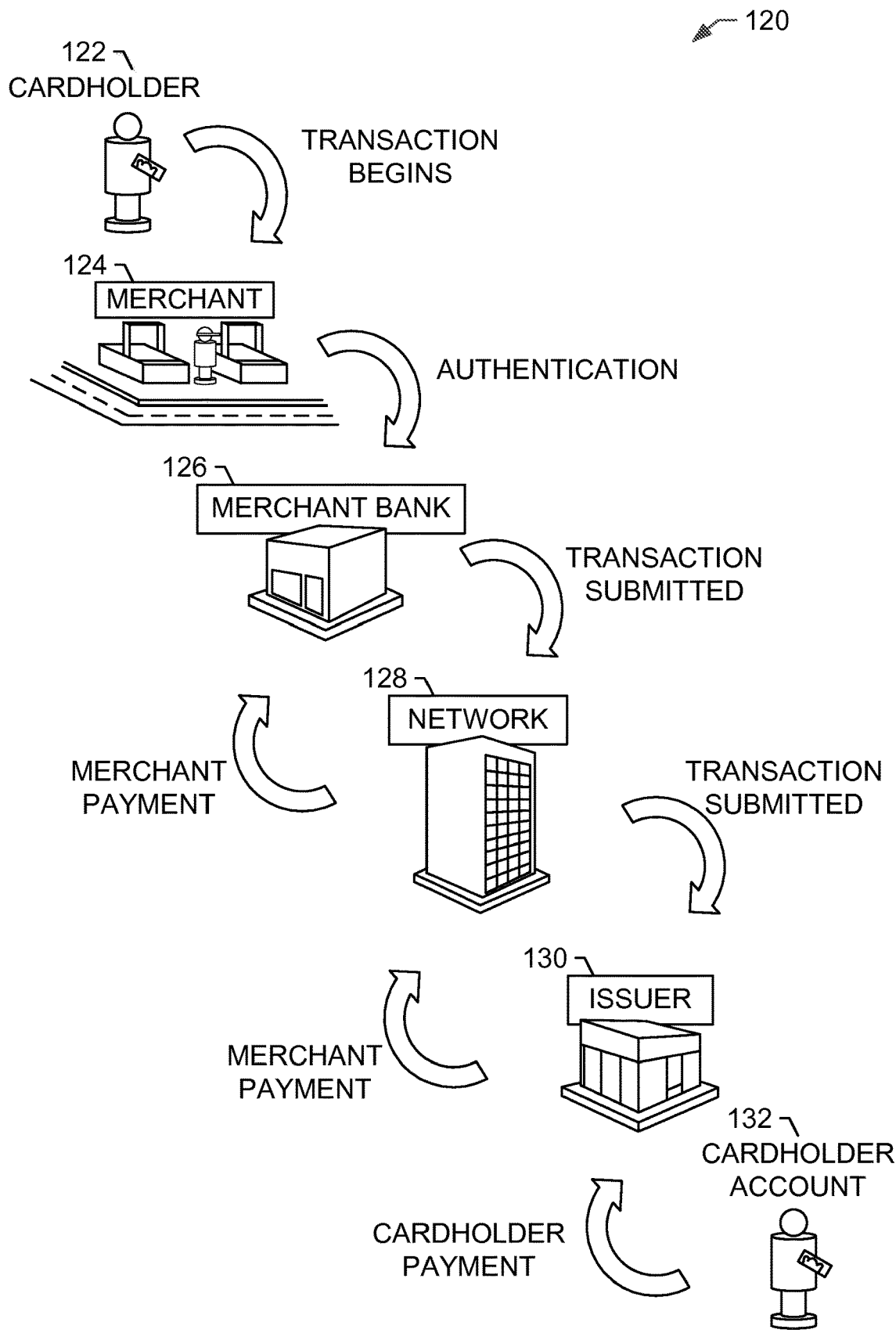
FIGS. 1-8 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION

The following detailed description of the embodiments of the disclosure refers to the accompanying drawings. The same reference numbers in different drawings may identify the same or similar elements. Also, the following detailed description does not limit the claims.

The system and methods described herein describe an adaptive recommendation ("AR") computer device configured to provide recommendations of items (goods and services) to a candidate consumer (also known as a candidate cardholder) based on the past actions (payment transactions and online activities) of the candidate consumer, the payment transactions of a plurality of other consumers, and a timing aspect associated with each of the past actions of the candidate consumer. In the example embodiment, the AR computer device is a user device such as a mobile phone or a personal computer and is configured to display recommendations to the candidate consumer. In some embodiments, the AR computer device includes computer code (i.e., an app) to determine and provide the recommendations to the candidate consumer.

The AR computer device is in communication with a recommendation server. The recommendation server is also in communication with a payment network. The recommendation server receives a plurality of historical payment transactions from a plurality of payment cardholders from the payment network. The recommendation server compares the plurality of historical payment transactions to determine at least one preference vector. Each preference vector represents a different item category (services or products) such as dining, home improvement, appliances, and events and is based on the payment transactions from the plurality of payment cardholders. The AR computer device receives the preference vectors from the recommendation server. The AR computer device generates personalized vectors by combining the received preference vectors with the candidate consumer's actions (payment transactions and online actions). Online actions may include, for example, web searching and web sites visited. The candidate consumer's actions include a timing component, such as when the action occurred. The timing component alters the personalized vectors based on the time since the action occurred. The AR computer device uses the personalized vectors to recommend items to a candidate consumer. As time passes and the AR computer device receives more historic payment transactions and more of the candidate consumer's online activities, the AR computer device is able to refine its preference vectors for the candidate consumer and is able to determine more personally specific recommendations. In some embodiments, the AR computer device contains an AR application (APP), where the AR APP is installed on the AR computer device.

The AR computer device is preprogrammed with algorithms that are learned from massive consumer's purchase behaviors and events. The algorithms are based on statistical and machine learning models which summarize similarities in behavior and prediction future potential behaviors. A user of the AR computer device can upload or link to his/her own transactions on the device internally. The AR computer device learns from the personal historical information and the pre-installed algorithms to make optimal recommendations. The recommendations are given from the AR computer device without transmitting any personal information from the AR computer device. The AR computer device is adaptive in that it automatically learns from the individual historical patterns and modifies and adjusts parameters to improve the recommendation qualities. For example, a user regularly refuels its car with gas every other week. With this knowledge, the AR computer device will adjust parameters to be closer to the personal behavior, search on a cloud-based merchant offer database, and recommend inexpensive gas stations close to the user when it is about to fill the gas tank. In another example, based on historical patterns, the pre-installed parameters of the AR computer device indicate that the consumer will like to eat Chinese food, but the AR computer device also learns the consumer's eating habits. For example the user may have a personal repeating pattern of ordering Chinese food three times and then ordering Italian food once. The AR computer device will then adjust its recommendations accordingly. In summary, the AR computer device uses pre-installed algorithms which are learned from the spending behavior of others and makes adjustments for the user based on the user's activities.

For example, a personalized vector in a vehicle category could note that the candidate consumer purchased a vehicle three years ago, and that on average consumers purchase a vehicle every six years. Or based on the candidate consumer's past transaction history, the personalized vector may indicate that the candidate consumer purchases a vehicle every five years. In this example, the AR computer device might not transmit recommendations for a new vehicle to the candidate consumer until a total of four years have passed since the candidate consumer purchased a vehicle. In another example, the AR computer device receives payment transaction data showing that the candidate consumer purchased sushi for lunch. If the personalized vectors indicate that the candidate consumer does not consume sushi two meals in a row, the AR computer device would not recommend sushi restaurants to the candidate consumer for dinner that day. In yet another example, the AR computer device may determine, based on the candidate consumer's web browsing history, that the candidate consumer is planning to purchase a television. The AR computer device recommends televisions and merchants who sell televisions to the candidate consumer. When the AR computer device receives a payment transaction indicating that the candidate consumer purchased a television, the AR computer device updates the personalized vectors so that the AR computer device no longer displays recommendations for televisions to the candidate consumer.

In the example embodiment, the AR computer device registers a candidate consumer for a recommendation service. Initially, the AR computer device receives preference vectors from the recommendation server. The preference vectors are a starting point for providing recommendations and are generated by the recommendation server based on a plurality of payment transactions from a plurality of cardholders. The AR computer device also receives initial consumer actions for the candidate consumer. In some embodiments, the AR computer device receives the initial consumer actions from the recommendation server. In these embodiments, the initial consumer actions may be historical payment transactions that the candidate consumer conducted with a payment card. In these embodiments, the AR computer device requests the historical payment transactions from the recommendation server. The recommendation server retrieves the historical payment transactions from the payment network and transmits the historical payment transactions to the AR computer device. In other embodiments, the candidate consumer may not want to connect the recommendation service with the candidate consumer's payment card account. In these embodiments, the AR computer device receives the initial consumer actions from the candidate consumer, such as through a survey. In other embodiments, the initial consumer actions may be based off of the candidate consumer's web browsing history or the candidate consumer's payment transactions through an app on the AR computer device.

To generate the initial personalized vectors, the AR computer device combines the initial consumer actions with the received preference vectors. These personalized vectors represent the propensities of the corresponding candidate consumer to purchase items and are used to recommend items to the candidate consumer. In the example embodiment, each personalized vector is for a different category of good or service (i.e., dining, home improvement, appliances, and events).

The AR computer device also links to one or more sources of data for consumer actions (payment transactions and online activities) performed by the candidate consumer. In some embodiments, the consumer action data may be transaction data from a payment card processing system that processes payment transactions initiated with a payment card associated with the candidate consumer. The AR computer device may receive the transaction data from the recommendation server. The transaction data for a payment transaction includes at least the items purchased, where the payment transaction was conducted, and when the payment transaction was conducted. In other embodiments, the consumer action data may be transaction data from a payment application on a mobile device, such as the AR computer device, where the payment application processes payment transactions for items purchased by the candidate consumer. In still other embodiments, the consumer action data may be online activities performed by the candidate consumer. The AR computer device may receive the consumer action data of online activities from one or more web browsers on which the candidate consumer may search for and purchase goods and services. The consumer action data includes a time aspect indicating at least when the consumer action took place.

After receiving consumer action data from one or more of the above sources, the AR computer device updates the corresponding personalized vector based on the consumer action data. For example, if the candidate consumer conducted a payment transaction for a television, then the AR computer device may update the personalized vector for appliances. The time aspect of such consumer actions allows the AR computer device to adjust the personalized vectors so that more recent consumer actions have more of an impact on the recommendations made to the candidate consumer than earlier consumer actions. For example, a candidate consumer might have purchased sushi on a regular basis for a couple of months and then not purchased sushi for the last two years. A personalized vector that does not include a time aspect might continue to indicate that the candidate consumer still has a propensity for purchasing sushi. However, a personalized vector that includes a time aspect for the consumer actions might not recommend sushi restaurants to the candidate consumer and instead recommend other types of dining establishments.

The AR computer device also receives local filter information. The local filter information includes current time, current geographic information, and most recent consumer actions. In some embodiments, the AR computer device receives the local filters from the recommendation server. In other embodiments, the AR computer device generates the local filters using, for example, an internal clock and a Global Positioning System (GPS) device. The AR computer device updates the personalized vectors for the candidate consumer based on the received local filter information. For example, if the time is 4:30 PM and the candidate consumer usually has dinner at 5:30 PM, the AR computer device may start displaying recommendations of places to eat dinner. In addition, using the current geographic information, the AR computer device may display recommendations for places to eat that are located near to the candidate consumer.

The AR computer device receives lists of plurality of merchants from the recommendation server. The AR computer device compares the plurality of merchants to the personalized vectors. The AR computer device ranks the recommendations based on the comparison. Based on the rankings, the AR computer device displays recommendations to the candidate consumer. In some embodiments, the candidate consumer uses the AR computer device to search for recommendations which the AR computer device displays, or causes to be displayed, in response. In other embodiments, the AR computer device displays the recommendations while the candidate consumer is web browsing or using applications or programs on the AR computer device.

In some embodiments, the AR computer device receives one or more publisher-pushed advertisements from the recommendation server. The AR computer device ranks these publisher-pushed advertisements based on the candidate consumer's personalized vectors to determine if the publisher-pushed advertisements are appropriate for the candidate consumer. The AR computer device might display a publisher-pushed recommendation only if the ranking of the publisher-pushed recommendation exceeds a predetermined threshold. If none of the pushed advertisements exceed the predetermined threshold that the pushed recommendation is appropriate for the candidate consumer, then none of the pushed advertisements are displayed.

In yet other embodiments, there are two AR computer devices, a first AR computer device and a second AR computer device, associated with the candidate consumer. The first AR computer device might communicate with the second AR computer device to synchronize personalized vectors and receive updated consumer actions. For example, the candidate consumer's mobile phone and laptop may synchronize vectors, so that the first AR computer device takes into account the candidate consumer's actions on the second AR computer device when updating the candidate consumer's personalized vectors. In some further embodiments, the first AR computer device may receive a signal from the candidate consumer. For example, the signal may be inputted directly into the first AR computer device by the candidate consumer or the signal may be received from the second AR computer device to delete the stored personalized vectors. In response to the signal, the first AR computer device deletes all action history and the personalized vectors associated with the candidate consumer. This option is useful in situations where the first AR computer device is a mobile computer device, such as a mobile phone, and is no longer under the candidate consumer's control or possession. If the candidate consumer reacquires the first AR computer device or acquires a new one, then the candidate consumer may use the second AR device to restore the personalized vectors in the first AR computer device.

In the example embodiment, the AR computer device performs the updating of the personalized vectors rather than transmitting information to the recommendation server. This insures that the personalized data about the candidate consumer remains on the AR computer device. While the AR computer device may receive transaction data about the candidate consumer from the recommendation server, the AR computer device does not transmit that data or other data to computer devices not in the control of the candidate consumer. This reduces the chance of compromising personally identifiable information. Additionally, this prevents the data about the candidate consumer's spending habits gathered by the AR computer device from being transferred to and used by outside companies and services. While some known systems use a central repository or a server computer device to perform calculations and store preference vectors for consumers, the AR computer device performs actions on and stores all of this data locally. Keeping the actions and data local to the AR computer device also reduces the amount of communication traffic required to use the recommendation server with AR computer device.

In some embodiments, the above described system stores transaction data or web browsing data without including sensitive personal information, also known as personally identifiable information or PII, in order to ensure the privacy of individuals associated with the stored data. Personally identifiable information may include any information capable of identifying an individual. For privacy and security reasons, personally identifiable information remains on the AR computer device, which is in the candidate consumer's control. PII is also withheld from the transaction data used to generate the preference vectors. In some examples where privacy and security, such as through encryption, can otherwise be ensured, or where individuals consent, personally identifiable information may be retained in the transaction data. In such examples, personally identifiable information may be needed in reports about groups of cardholders. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined Thus, the individual may have control over how information is collected about the individual and used by systems including the travel application.

The methods and systems described herein may be implemented using computer programming or engineering techniques including computer software, firmware, hardware, or any combination or subset. As disclosed above, at least one technical problem with known systems is that these known system lack the ability to incorporate a time aspect of consumer actions into predicting future purchases of a consumer. The system and methods described herein address that technical problem. The technical effect of the systems and processes described herein is achieved by performing at least one of the following steps: (a) receiving from a recommender server computing device at least one preference vector, wherein the at least one preference vector based on a plurality of payment transactions from a plurality of cardholders; (b) storing the at least one preference vector; (c) receiving at least one consumer action including a time aspect from the candidate consumer; (d) determining at least one personalized vector based on the at least one preference vector, the at least one consumer action, and the time aspect associated with each of the at least one consumer action, wherein the at least one personalized vector indicates at least one future purchase that the candidate consumer may conduct and is also based on a current time of day, a current geographic location of the candidate consumer, and an amount of time since the at least one consumer action occurred; (e) receiving transaction data for a payment transaction to purchase an item completed by the candidate consumer; (f) adjusting the at least one personalized vector based on the received transaction data; (g) preventing a display of at least one recommendation to the candidate consumer based on the adjusted personalized vector in response to the transaction data; and (h) displaying at least one recommendation to the candidate consumer based on the at least one personalized vector. The resulting technical effect is that by incorporating a time aspect into the prediction of future purchases of a consumer based on that consumer's actions provides more accurately tailored recommendations for that consumer. Additional technical effects provided include reducing message traffic to a server system to provide faster recommendations and protecting PII by not storing the PII on a remote server. One further technical effect of this adaptive learning recommender that learns from consumer's actions and automatically updates item recommendations, is that it can improve the speed and accuracy of web searching, targeted marketing and advertising, and geographic based store recommendations.

Described herein are computer systems such as AR computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation.

FIG. 1 is a schematic diagram illustrating an example multi-party transaction card industry system 120 for enabling payment-by-card transactions in which merchants 124 and card issuers 130 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128 (also known as a payment network), computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
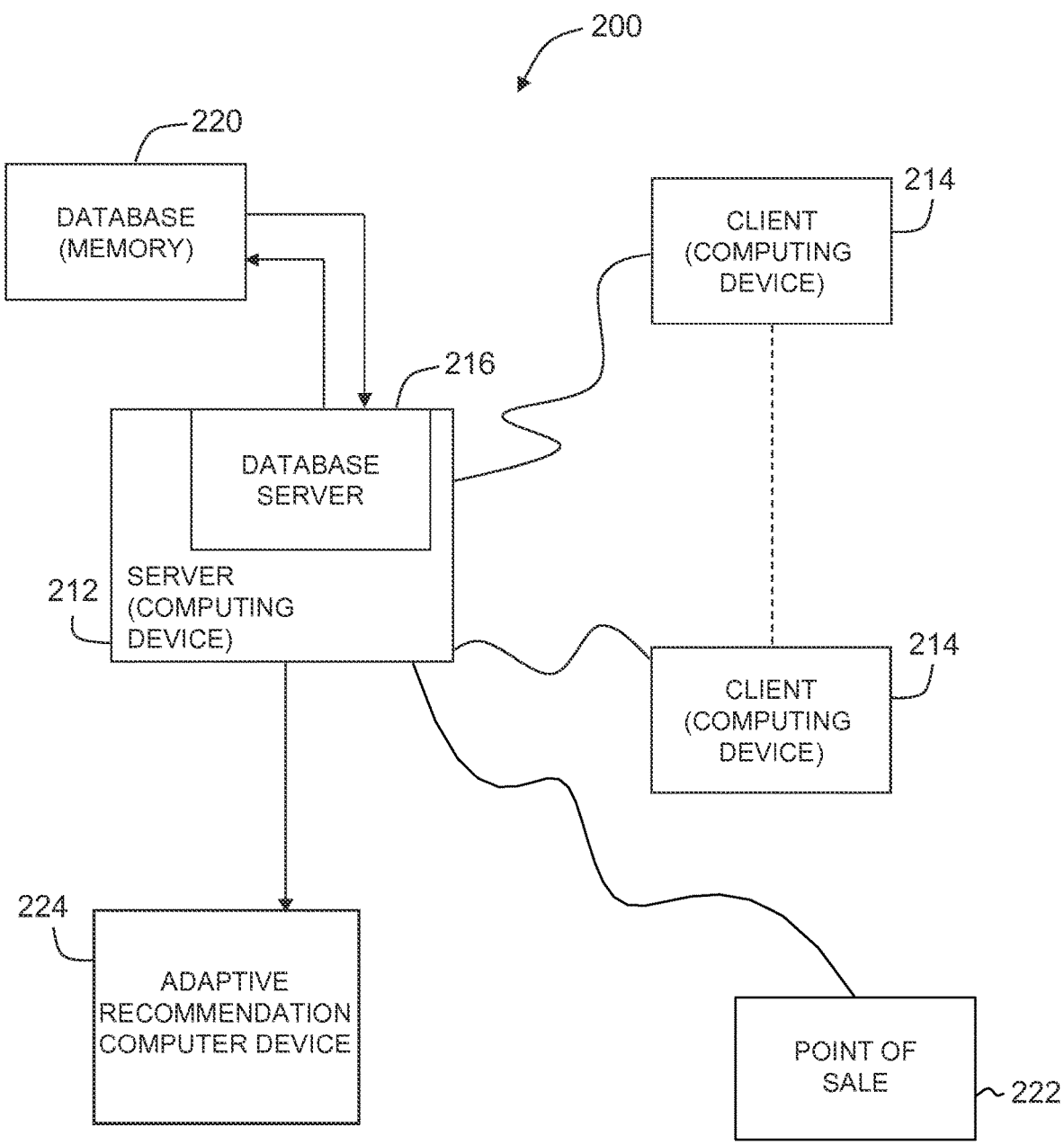

FIG. 2 is a simplified block diagram of an example system 200 used for recommending items for future purchase by a consumer based on the consumer's historical actions in accordance with one example embodiment of the present disclosure. In the example embodiment, system 200 may be used for processing cardholder payment transactions. In addition, system 200 is a payment processing system that includes an adaptive recommendation ("AR") computer device 224 configured to provide recommendations of items (goods and services) to a candidate consumer based on the past actions (payment transactions and online activities) of the candidate consumer, the payment transactions of a plurality of other consumers, and a timing aspect associated with each of the past actions of the candidate consumer. As described below in more detail, AR computer device 224 is configured to receive and store a preference vector, receive user actions from a candidate consumer, determine a personalized vector for the candidate consumer based on preference vector, the consumer action, and the time of the consumer action, and display a recommendation to the candidate consumer based on the personalized vector.

In the example embodiment, client systems 214 are computers that include a web browser or a software application, which enables client systems 214 to access server system 212 using the Internet. More specifically, client systems 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 216 is communicatively coupled to a database 220 that stores data. In one embodiment, database 220 includes preference vectors based on payment transactions from a plurality of cardholders, consumer actions, local filters, and potential recommendations. In the example embodiment, database 220 is stored remotely from server system 212. In some embodiments, database 220 is decentralized. In the example embodiment, a person can access database 220 via client systems 214 by logging onto server system 212, as described herein.

AR computer device 224 is communicatively coupled with server system 212. AR computer device 224 can access server system 212 to access data stored in database 220. In the example embodiment, AR computer device 224 is associated with a cardholder 122 (shown in FIG. 1) and is merely in communication with the payment card system 120. AR computer device 224 is a computer that includes a web browser or a software application, which enables AR computer device 224 to access server system 212 using the Internet. More specifically, AR computer device 224 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. AR computer device 224 can be any device capable of accessing the Internet including, but not limited to, a desktop computer, a laptop computer, a personal digital assistant (PDA), a cellular phone, a smartphone, a tablet, a phablet, or other web-based connectable equipment.

One or more point of sale systems 222 are communicatively coupled with server system 212. The one or more point of sale systems 222 can be merchants 124 shown in FIG. 1, where point of sale systems 222 are communicatively coupled with server system 212 through the payment card system 120. In the example embodiment, point of sale systems 222 may be, but are not limited to, machines that accept physical payment cards, online payment portals, or stored payment card numbers for recurring payment transactions.

In some embodiments, server system 212 may be associated with a financial transaction interchange network 128 shown in FIG. 1, and may be referred to as an interchange computer system. Server system 212 may be used for processing payment transaction data and analyzing for fraudulent payment transactions. In addition, at least one of client systems 214 may include a computer system associated with an issuer of a payment card. Accordingly, server system 212 and client systems 214 may be utilized to process transaction data relating to purchases a cardholder 122 makes utilizing a transaction card processed by the interchange network 128 and issued by the associated issuer 130. At least one client system 214 may be associated with a user or a cardholder seeking to register, access information, or process a transaction with at least one of the interchange network, the issuer, or the merchant. In addition, client systems 214 or point of sales systems 222 may include point-of-sale (POS) devices associated with a merchant and used for processing payment transactions.

Figure 3:
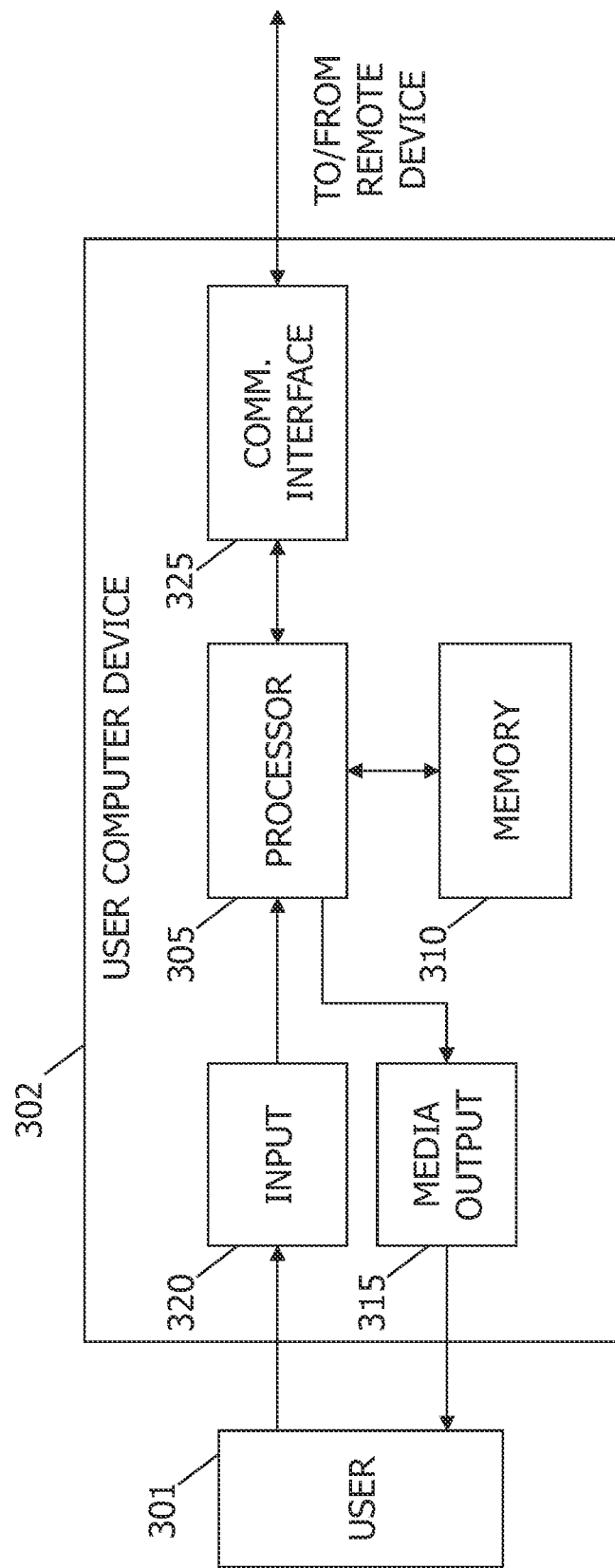

FIG. 3 illustrates an example configuration of client system 214 shown in FIG. 2, in accordance with one embodiment of the present disclosure. User computer device 302 is operated by a user 301. User computer device 302 may include, but is not limited to, client systems 214 and AR computer device 224 (both shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. The output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320, without limitation, to select and/or enter one or more items to purchase and/or a purchase request, or to access credential information and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server system 212 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from server system 212. A client application allows user 301 to interact with, for example, server system 212. For example, instructions may be stored by a cloud service, and the output of the execution of the instructions sent to the media output component 315.

Figure 7:
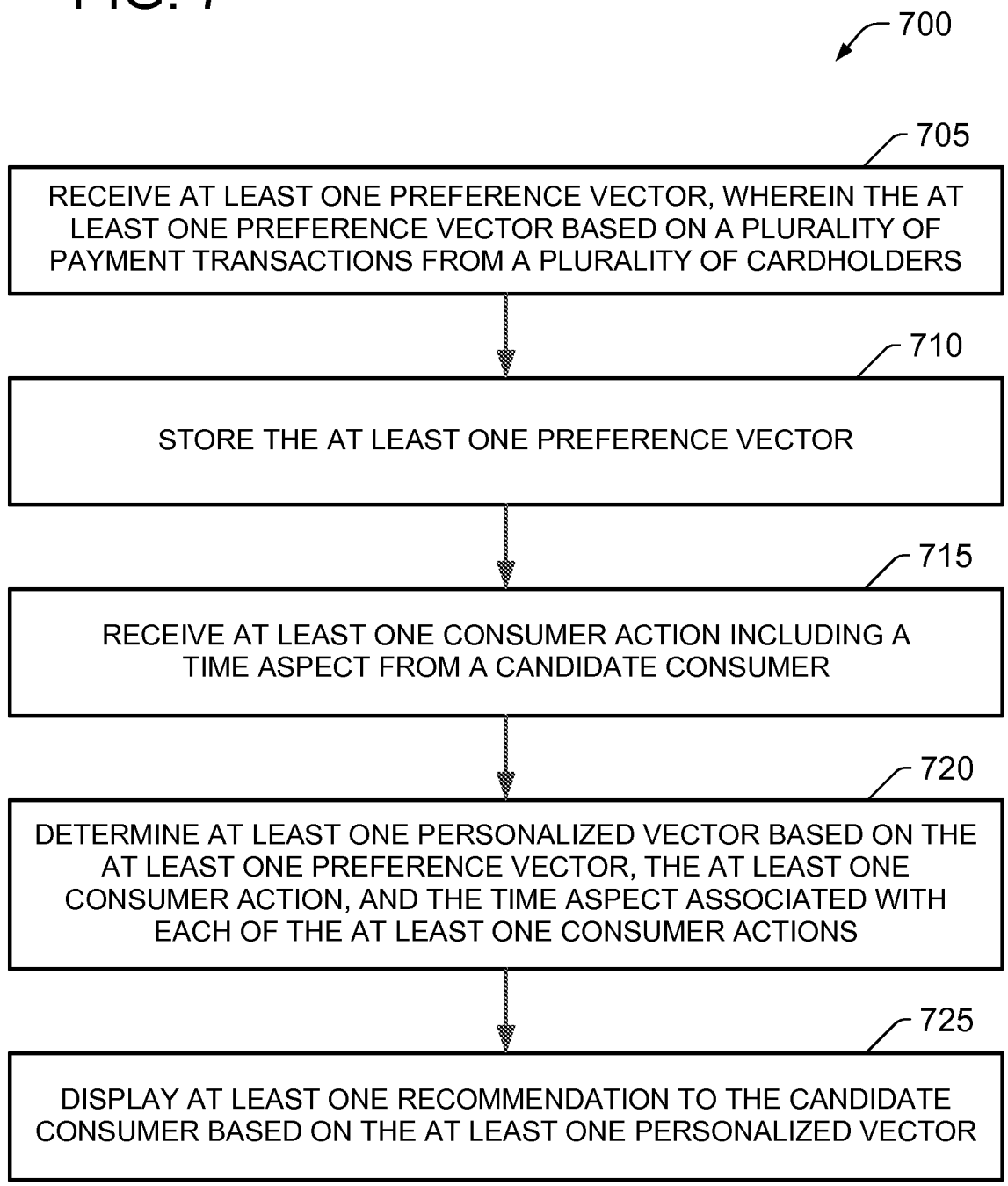

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 is programmed with instructions such as illustrated in FIG. 7.

Figure 4:
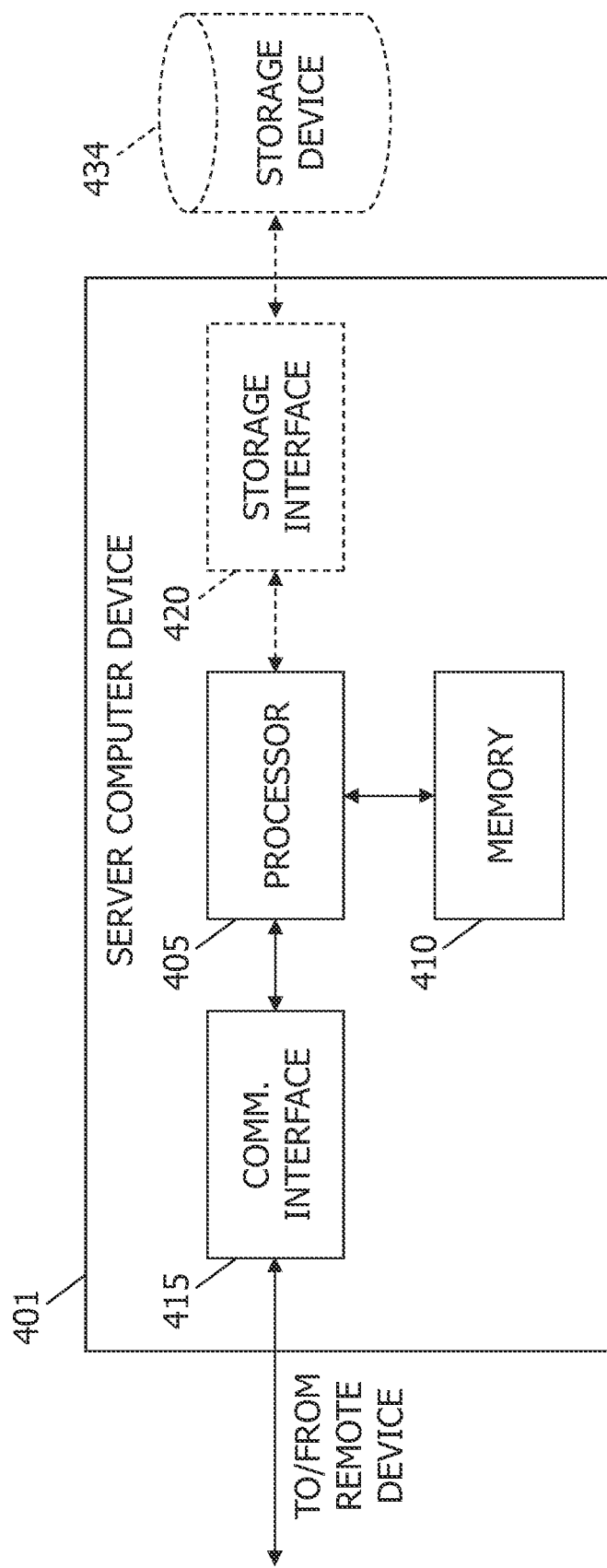

FIG. 4 illustrates an example configuration of server system 212 shown in FIG. 2, in accordance with one embodiment of the present disclosure. Server computer device 401 may include, but is not limited to, server system 212 and database server 216 (shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214, or AR computer device 224 (both shown in FIG. 2). For example, communication interface 415 may receive requests from client systems 214 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420.

Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 5:
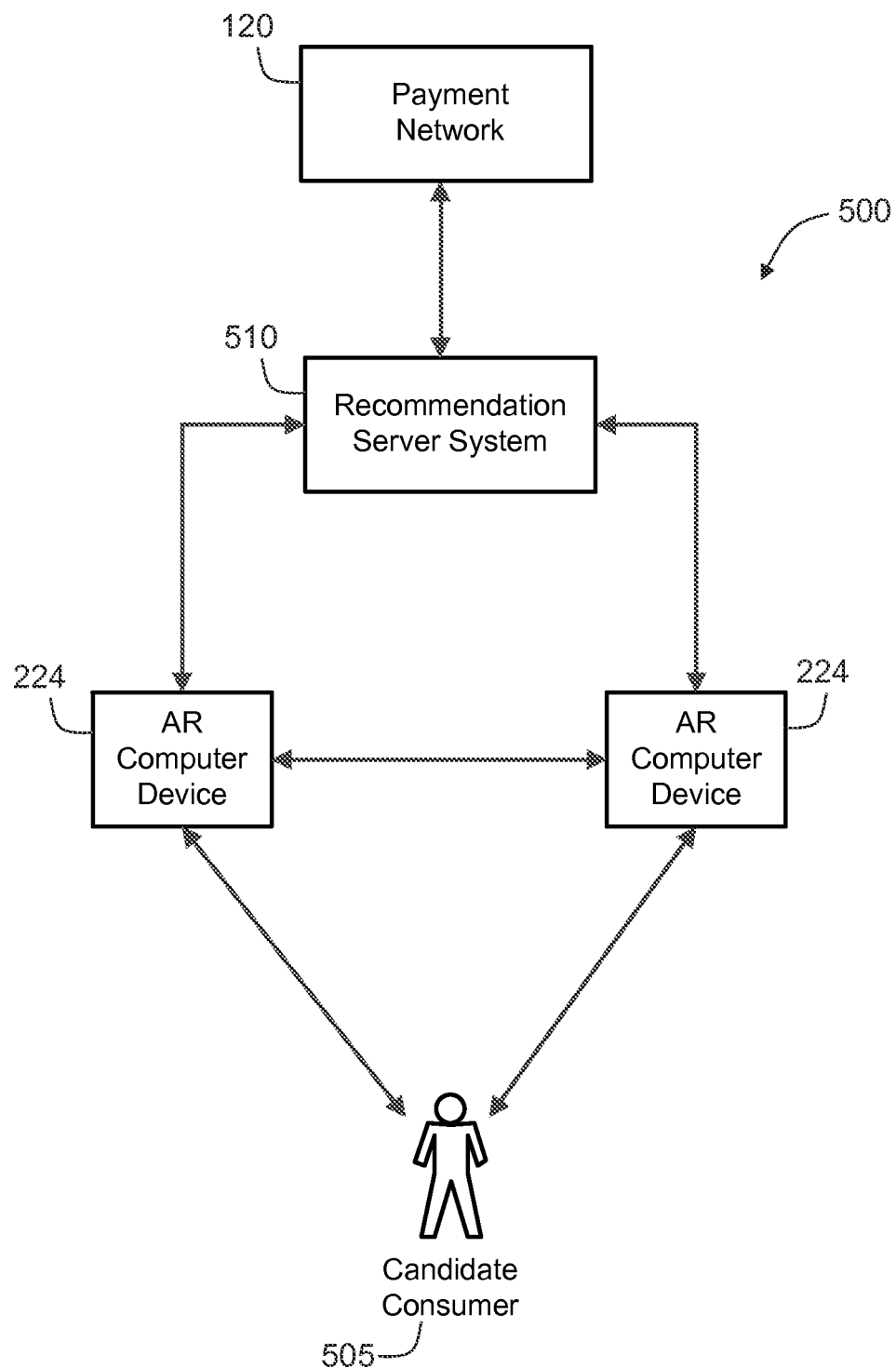

FIG. 5 is a simplified block diagram of an example system 500 used for recommending items for future purchase by a candidate consumer 505 based on the consumer's historical actions in accordance with system 200 shown in FIG. 2. System 500 includes a recommendation server 510 in communication with one or more AR computer devices 224. AR computer devices 224 are in communication with a candidate consumer 505. In some embodiments, candidate consumer is similar to cardholder 122 shown in FIG. 1. Recommendation server 510 may be similar to server system 212 (shown in FIG. 2) and server computer device 401 (shown in FIG. 4). In some embodiments, recommendation server 510 may be a part of or associated with payment system 120. In other embodiments, recommendation server 510 may merely be in communication with payment system 120 as is shown in FIG. 5.

Recommendation server 510 receives from payment system 120 a plurality of historical payment transactions from a plurality of cardholders. Recommendation server 510 compares the plurality of historical payment transactions to determine at least one preference vector. Each preference vector represents a different item category (services or products) such as dining, home improvement, appliances, and events and is based on the payment transactions from the plurality of payment cardholders. For example, recommendation server 510 compares a plurality of payment transactions to determine purchasing patterns of the associated cardholders. Recommendation server 510 then assembles the patterns into preference vectors.

In the example embodiment, recommendation server 510 receives the plurality of payment transactions from interchange network 128, shown in FIG. 1. As described above, payment network 120 is configured to process payment card transactions between a merchant 124 and a cardholder 122. In other embodiments, the plurality of payment transactions may be provided by third party sources, such as merchant bank 126, issuer bank 130 (both shown in FIG. 1), or a payment transaction aggregator in communication with one or more payment networks 120. The plurality of payment transactions include data relating to purchases made by a plurality of cardholders 122 at a plurality of merchants 124 during a predetermined time period and within a predetermined geographical region. In some embodiments, the purchases made by the plurality of cardholders are related to each other as being in the same market segment or category, for example, but not limited to, a dining segment, an events segment, a night club segment, or an activities segment. Recommendation server 510 uses these categories to generate the different preference vectors.

In one embodiment, for cardholders 122 that transact at two or more merchants of the plurality of merchants, the recommendation server 510 creates a matrix of merchant associations for the plurality of merchants 124 indicating the number of transactions between each merchant 124 combination and the cardholders 122. For each cardholder 122 that has transacted at multiple merchants within the specified segment, recommendation server 510 updates the association matrix with the transaction data. More specifically, a counter is associated with each merchant within the matrix. For each pair of merchants visited by each cardholder, recommendation server 510 increments the counter associated with those merchants. Accordingly, the more cardholders of the plurality of cardholders transact with a particular merchant, the more associations that merchant will obtain within the matrix.

In some embodiments, AR computer device 224 contains an AR application (APP), where AR computer device 224 is a compiled computer system such as a PC or a mobile device, where the AR APP is installed on AR computer device 224. AR computer device 224 is preprogrammed with algorithms that are learned from massive consumer's purchase behaviors and events. The algorithms are based on statistical and machine learning models which summarize similarities in behavior and prediction future potential behaviors. For AR computer device 224 user, the user can upload or link to his/her own transactions on the device internally. The APP will learn from the personal historical information and based on the pre-installed algorithms to make optimal recommendations. The recommendations are given from the APP on the device without transmitting any personal information from the device. The APP is adaptive in that it automatically learns from the individual historical patterns and modifies and adjusts parameters to improve the recommendation qualities. For example, an APP user regularly refuels its car with gas every other week. With this knowledge, the APP will adjust some APP parameters more close to the personal behavior, searches on a cloud-based merchant offer database, and recommend inexpensive gas stations near by when it is about to fill the gas tank. In another example, based on historical patterns, the preinstalled parameters of the APP indicate that the consumer will like to eat Chinese food, but the APP also self-learned the consumer's eating habits. For example the user may have a personal repeating pattern of ordering Chinese food three times and then ordering Italian food once. The APP will then adjust its recommendations accordingly. In summary, APP uses pre-installed algorithms which are learned from the spending behavior of others and makes adjustments for the user based on the user's activities.

In some embodiments, recommendation server 510 determines which merchants associated with a specified segment are located within a predetermined region (e.g., a city or a specified radius from a location) and inputs those merchants into a matrix. For example, the matrix includes merchants A, B, C, D, E, and F. Recommendation server 510 obtains transaction data containing payment transactions for cardholders that have transacted with merchants A, B, C, D, E, and/or F during a specified time period or window of observation. Using the transaction data, recommendation server 510 populates matrix to obtain a matrix of merchant associations. In the example embodiment, a cardholder must have transacted with two or more of merchants A, B, C, D, E, and F to be counted in matrix. This facilitates reducing an effect of cardholder bias toward a single merchant. In the example, for each pair of merchants a cardholder has transacted with, recommendation server 510 increments a counter associated with the merchant pair. For example, because a $1^{st}$ cardholder transacted with merchants A and B, recommendation server 510 increments a value stored in block (A, B) of the matrix by a value of one to show the relationship between the two merchants. Additionally, block (B, A) is incremented by one. For example, if both a $2^{nd}$ and a $3^{rd}$ cardholder transacted with merchants E and B, recommendation server 510 increments blocks (E, B) and (B, E) by a value of two in matrix. In other embodiments, the matrix may only be updated in block (B, E) when the cardholder transacts with merchant B and then merchant E, whereas block (E, B) is update when the cardholder transacts with merchant E and then merchant B. Once complete with all of the transaction data, the matrix of merchant associations provides a measure of the associations between each pair of merchants based on how often cardholders transact with both merchants of the pair. Additionally, the matrix of merchant associations illustrates a popularity of each merchant relative to the other merchants based on historical data, free from cardholder bias. In this example, the matrix for each category is stored as a preference vector.

When candidate consumer 505 uses AR computer device 224 to register with a recommendation service, recommendation server 510 transmits the preference vectors to AR computer device 224. AR computer device 224 receives the preference vectors. In some embodiments, candidate consumer 505 may register for the recommendation service on two or more AR computer devices 224. In these embodiments, the two or more AR computer devices 224 may communicate with each other. For example, the two or more AR computer devices 224 may transmit personalized vectors, consumer actions, or other information to allow the receiving AR computer device 224 to update the personalized vectors that are stored on that AR computer device 224.

In yet other embodiments, there are two AR computer devices 224, a first AR computer device 224 and a second AR computer device 224, associated with candidate consumer 505. First AR computer device 224 might communicate with second AR computer device 224 to synchronize personalized vectors and receive updated consumer actions. For example, the candidate consumer's mobile phone and laptop may synchronize vectors, so that first AR computer device 224 takes into account the candidate consumer's actions on second AR computer device 224 when updating the candidate consumer's personalized vectors. In some further embodiments, first AR computer device 224 may receive a signal from candidate consumer 505. For example, the signal may be inputted directly into first AR computer device 224 by candidate consumer 505 or the signal may be received from second AR computer device 224. In response to the signal, first AR computer device 224 deletes all action history and the personalized vectors associated with candidate consumer 505. This option is useful in situations where first AR computer device 224 is a mobile computer device, such as a mobile phone, and is no longer under the candidate consumer's control or possession. If candidate consumer 505 reacquires first AR computer device 224 or acquires a new one, then candidate consumer 505 may use second AR device 224 to restore the personalized vectors in first AR computer device 224.

In the example embodiment, AR computer device 224 performs the updating of the personalized vectors rather than transmitting information to recommendation server 510. This insures that the personalized data about candidate consumer 505 remains on AR computer device 224. While AR computer device 224 may receive transaction data about candidate consumer 505 from recommendation server 510, AR computer device 224 does not transmit that data or other data to computer devices not in the control of candidate consumer 505. This reduces the chance of compromising personally identifiable information. Additionally, this prevents the information gathered by AR computer device 224 from being transferred to and used by outside companies and services. While some known systems use a central repository or server computer device to perform calculations and make recommendations for consumers, AR computer device 224 performs actions on and stores all of this data locally. Keeping the actions and data local to AR computer device 224 also reduces the amount of communication traffic required to use recommendation server 510 with AR computer device 224.

Figure 6:
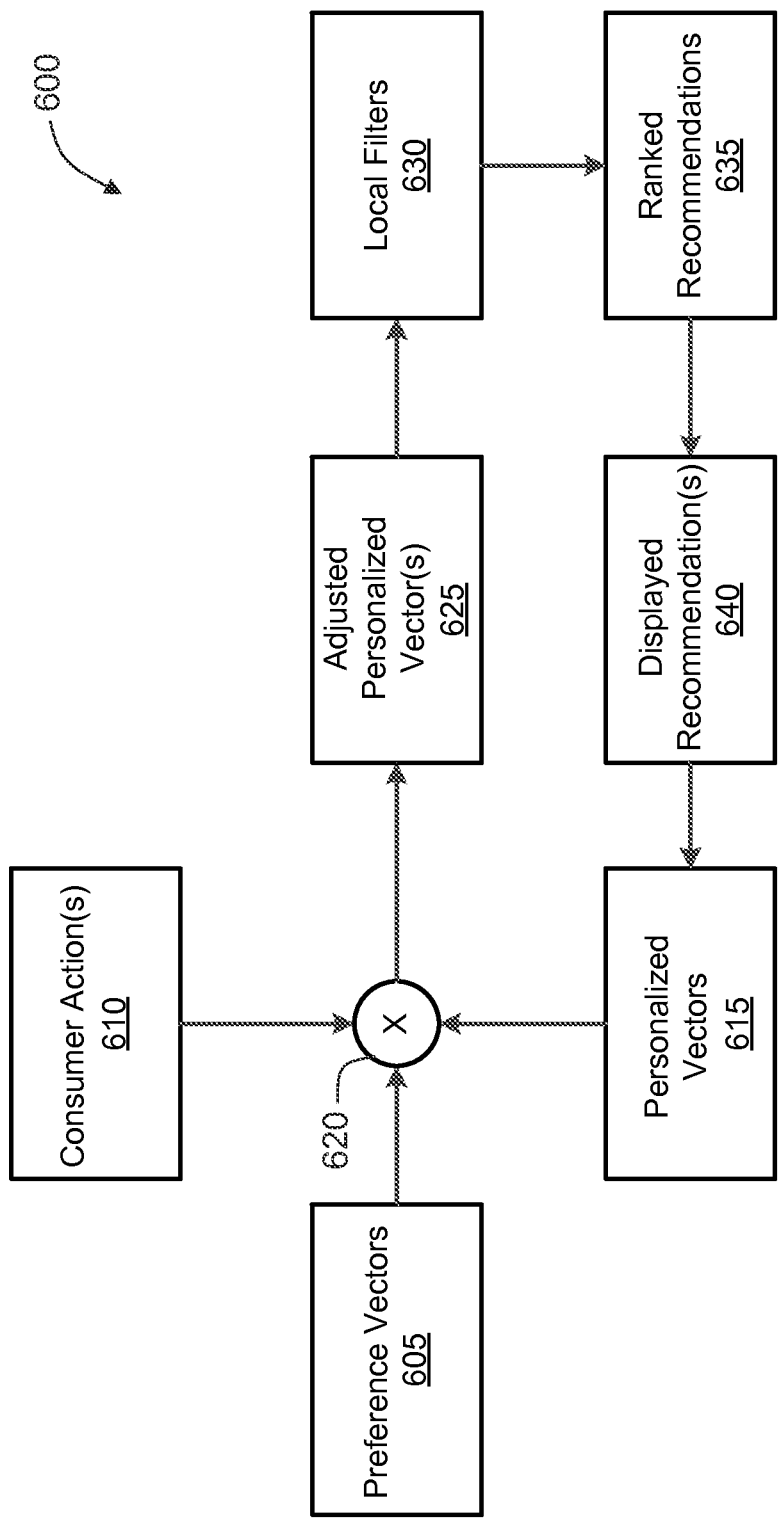

FIG. 6 is a flow diagram illustrating an iterative system 600 for recommending items for future purchase by candidate consumer 505 (shown in FIG. 5) based on the candidate consumer's actions 610 using systems 200 and 500 shown in FIGS. 2 & 5. In the example embodiment, iterative system 600 is performed by AR computer device 224 (shown in FIG. 2).

Iterative system 600 includes a preference vector 605, one or more consumer actions 610, and one or more personalized vectors 615. In the example embodiment, candidate consumer 505 (shown in FIG. 5) registers for a recommendation service. Initially, AR computer device 224 receives at least one preference vector 605 from recommendation server 510 (shown in FIG. 5). Preference vectors 605 are a starting point for providing recommendations 640 to candidate consumer 505 and are generated by recommendation server 510 based on a plurality of payment transactions from a plurality of cardholders. Each preference vector 605 represents a different category of good and services (i.e., dining, home improvement, appliances, and events).

AR computer device 224 also receives initial consumer actions 610 for candidate consumer 505. In one embodiment, AR computer device 224 receives the initial consumer actions 610 from recommendation server 510, which is in communication with payment network 120 (shown in FIG. 1). In these embodiments, initial consumer actions 610 may be historical payment transactions that candidate consumer 505 conducted with a payment card. In these embodiments, AR computer device 224 requests the historical payment transactions from recommendation server 510. Recommendation server 510 retrieves the historical payment transactions from payment network 120 and transmits the historical payment transactions to AR computer device 224. In other embodiments, candidate consumer 505 may not want to connect the recommendation service with the candidate consumer's payment card account 132 (shown in FIG. 1). In these embodiments, AR computer device 224 receives initial consumer actions 610 from candidate consumer 505, such as through a survey. In other embodiments, initial consumer actions 610 may be based off of the candidate consumer's web browsing history or the candidate consumer's payment transactions through an app on AR computer device 224.

To generate the initial personalized vectors 615, AR computer device 224 combines 620 initial consumer actions 610 with the received preference vectors 605. These personalized vectors 615 represent the propensities of the corresponding candidate consumer 505 to purchase items and are used to recommend items to candidate consumer 505. In the example embodiment, each personalized vector is for a different category of good or service (i.e., dining, home improvement, appliances, and events).

After setting up the initial personalized vectors 615, AR computer device 224 monitors current consumer actions 610. In some embodiments, AR computer device 224 links to one or more sources of data for consumer actions 610 (payment transactions and online activities) performed by candidate consumer 505. In some of these embodiments, the consumer action data may be transaction data from payment card processing system 120 that processes payment transactions initiated with a payment card associated with the candidate consumer. AR computer device 224 may receive the transaction data from recommendation server 510. The transaction data for a payment transaction includes at least the items purchased, where the payment transaction was conducted, and when the payment transaction was conducted. In other embodiments, the consumer action data may be transaction data from a payment application on a mobile device, such as AR computer device 224, where the payment application processes payment transactions for items purchased by candidate consumer 505. In still other embodiments, the consumer action data may be online activities performed by candidate consumer 505. AR computer device 224 may receive the consumer action data of online activities from one or more web browsers on which candidate consumer 505 may search for and purchase goods and services. The consumer action data includes a time aspect indicating at least when the consumer action 610 took place.

After the initial creation of the at least one personalized vector 615, AR computer device 224 constantly executes iterative system 600 to update the one or more personalized vectors 615 based on consumer actions 610. After receiving consumer action data from one or more of the above sources, AR computer device 224 updates the corresponding personalized vector 615 based on the consumer action data. For example, if candidate consumer 505 conducted a payment transaction for a television, then AR computer device 224 may update the personalized vector 615 for appliances. The time aspect of such consumer actions 610 allows AR computer device 224 to adjust personalized vectors 615 so that more recent consumer actions 610 have more of an impact on recommendations displayed 640 to candidate consumer 505 than earlier consumer actions 610. For example, candidate consumer 505 might have purchased sushi on a regular basis for a couple of months and then not purchased sushi for the last two years. A personalized vector 615 that does not include a time aspect might continue to indicate that candidate consumer 505 still has a propensity for purchasing sushi. However, a personalized vector 615 that includes a time aspect for consumer actions 610 might not recommend sushi restaurants to candidate consumer 505 and instead recommend other types of dining establishments.

AR computer device 224 combines 620 consumer action 610 with the at least one personalized vector 615 to generate an adjusted personalized vector 625. In the example embodiment, a linear function is created for each category k:

$$L(k) = \alpha_0^k + \Sigma_i V_i \alpha_{ik} + \Sigma_i X_i \beta_i \quad \text{Eq. (1)}$$

where $\alpha_0^k$ is a constant for category k, $\Sigma_i V_i \alpha_{ik}$ is the impact due to the consumer vector V in the domain category, and $\Sigma_i X_i \beta_i$ is the out-of-domain impact of candidate consumer 505. For a given consumer vector element $V_i$, the model fits the equation and finds the optimal parameter $\alpha_{ij}^k$ based on the preference vector and the initial consumer action for category k. The $\Sigma_i X_i \beta_i$ term represents consumer's other behaviors that will also influence the recommendations for category k. For each new consumer action in category k, AR computer device 224 updates the following probabilities.

$$P_k(t+1) = P_k(t) + \{\alpha_{ik} P_k(t)[(1 - P_k(t)] - P_k(t) \Sigma_{j \neq k} \alpha_{ij} P_j(t)\} \Delta V_i \quad \text{Eq. (2)}$$

where $P_k(t+1)$ is the probability for category k at next time (t+1) which depends on the past information and incremental change in vector $\Delta V_i$ of category i. This set of non-linear iteration equations indicates that a change in ith category will impact probabilities in all categories. For the sake of simplicity, the terms referring to other influences have been dropped from the equations.

AR computer device 224 also receives local filter information 630. Local filter information 630 includes current time, current geographic information, and most recent actions. In some embodiments, AR computer device 224 receives local filters 630 from recommendation server 510. In other embodiments, AR computer device 224 generates local filters 630 using, for example, an internal clock and a Global Positioning System (GPS) device. AR computer device 224 applies the local filters 630 to adjusted personalized vector 625 to update the personalized vectors 615 for candidate consumer 505 based on the received local filters 630. For example, if the time is 4:30 PM and the candidate consumer usually has dinner at 5:30 PM, AR computer device 224 may start displaying recommendations of places to eat dinner. In addition using the current geographic information, AR computer device 224 may display recommendations for places to eat that are near candidate consumer 505.

AR computer device 224 ranks the recommendations 635 for candidate consumer 505 based on the adjusted preference vector after the local filters 630 have been applied. In the example embodiment, rather than storing all of the available merchants 124, AR computer device 224 may request lists of merchants 124 from database 220 (shown in FIG. 2) or recommendation server 510 when needed. For example, if candidate consumer 505 is looking for dinner and is visiting a different city, then AR computer device 224 may request a list of restaurants for the city that candidate consumer 505 is visiting. AR computer device 224 then ranks the list of restaurants based on the candidate consumer's adjusted personalized vectors 625.

Based on ranked recommendations 635, AR computer device 224 determines one or more recommendations to display 640 to candidate consumer 505. In some embodiments, candidate consumer 505 uses AR computer device 224 to search for recommendations which AR computer device 224 displays, or causes to be displayed, in response. In other embodiments, AR computer device 224 displays the recommendations 640 while candidate consumer 505 is web browsing or using other applications or programs on AR computer device 224.

Adjusted personalized vector 625 then replaces personalized vector 615 so that AR computer device 224 uses the recently adjusted personalized vector 625 to combine with the next consumer action 610. Then AR computer device 224 cycles through another iteration of system 600.

In some embodiments, AR computer device 224 receives one or more publisher-pushed recommendations from recommendation server 510. The publisher-pushed recommendations are recommendations for merchants that are paying for their location or product to be displayed as a recommendation. AR computer device 224 ranks these publisher-pushed recommendations based on the candidate consumer's 505 personalized vectors 615 to determine if the publisher-pushed recommendations are appropriate for candidate consumer 505. AR computer device 224 might display a publisher-pushed recommendation only if the ranking of the publisher-pushed recommendation exceeds a predetermined threshold. If none of the pushed advertisements exceed the predetermined threshold that the pushed recommendation is appropriate for the candidate consumer, then none of the pushed advertisements are displayed.

FIG. 7 is a flow chart of a process 700 recommending items for future purchase by candidate consumer 505 (shown in FIG. 5) based on the consumer's historical actions 610 (shown in FIG. 6) using systems 200 and 500 shown in FIGS. 2 & 5. In the example embodiment, process 700 is performed by AR computer device 224 (shown in FIG. 2).

AR computer device 224 receives 705 at least one preference vector 605 (shown in FIG. 6), wherein the at least one preference vector 605 is based on a plurality of payment transactions from a plurality of cardholders. AR computer device 224 stores 710 the at least one preference vector 605. AR computer device 224 receives 715 at least one consumer action 610 (shown in FIG. 6) including a time aspect from candidate consumer 505. AR computer device 224 determines 720 at least one personalized vector 615 (shown in FIG. 6) based on the at least one preference vector 605, the at least one consumer action 610, and the time aspect associated with each of the at least one consumer action 610. AR computer device 224 displays 725 at least one recommendation 640 to candidate consumer 505 based on the at least one personalized vector 615.

Figure 8:
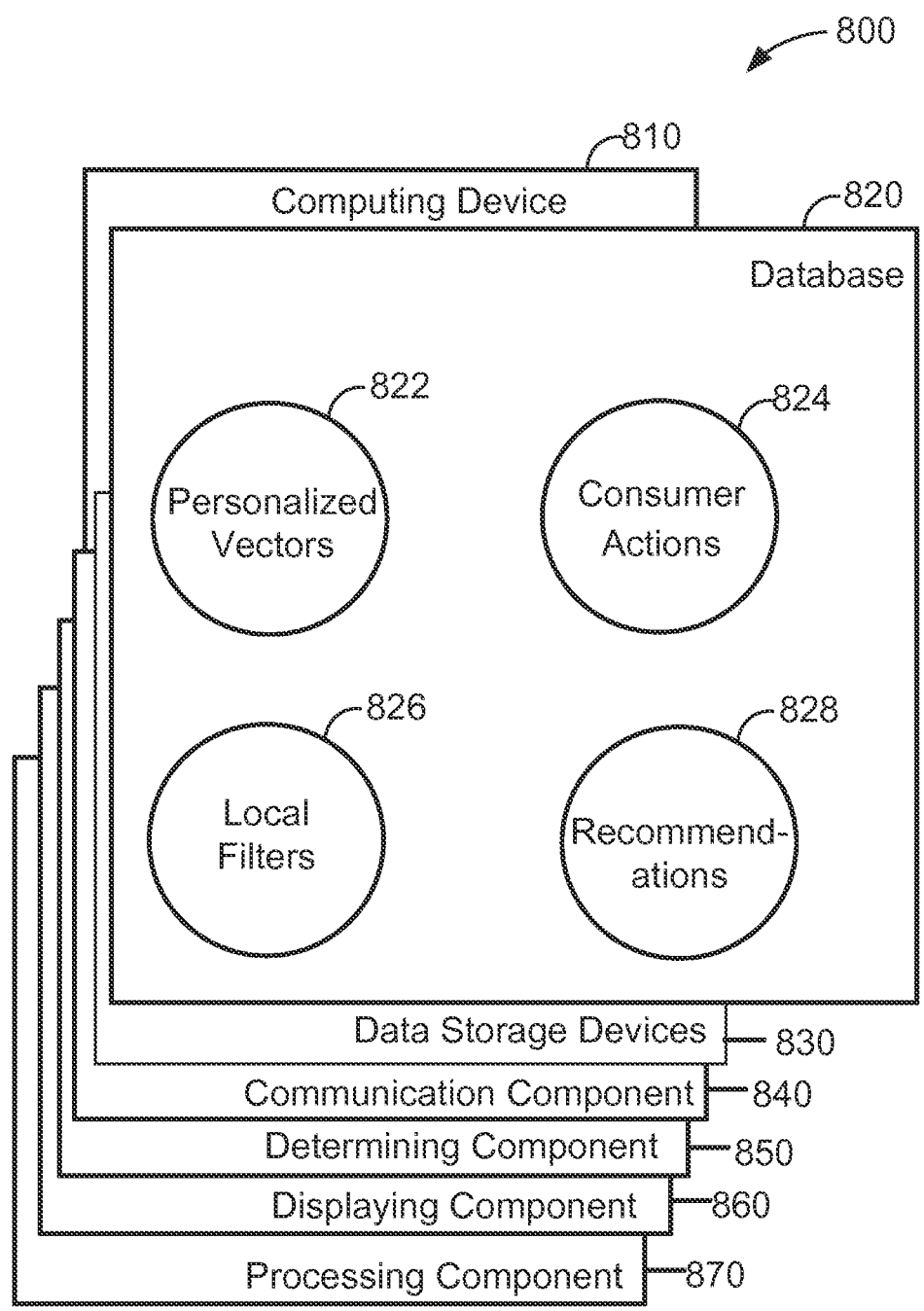

FIG. 8 is a diagram 800 of components of one or more example computing devices 810 that may be in the systems shown in FIGS. 2 & 5. In some embodiments, computing device 810 is similar to server system 212; computing device 810 may also be similar to AR computer device 224 (both shown in FIG. 2) and recommendation server 510 (shown in FIG. 5). A database 820 may be coupled with several separate components within computing device 810, which perform specific tasks. In this embodiment, database 820 includes personalized vectors 822 (which may be similar to personalized vectors 615 shown in FIG. 6), consumer actions 824 (which may be similar to consumer actions 610 shown in FIG. 6), local filters 826 (which may be similar to local filters 630 shown in FIG. 6), and recommendations 828 (which may be similar to ranked recommendations 635 and displayed recommendations 640 shown in FIG. 6). In some embodiments, database 820 is similar to database 220 (shown in FIG. 2).

Computing device 810 includes database 820, as well as data storage devices 830. Computing device 810 also includes a communication component 840 for receiving 705 at least one preference vector 605 and receiving 715 at least one consumer action (both shown in FIG. 7). Computing device 810 also includes a determining component 850 for determining 720 at least one personalized vector (both shown in FIG. 7). Computing device 810 further includes a displaying component 860 for displaying 725 at least one recommendation to the candidate consumer (shown in FIG. 7). A processing component 870 assists with execution of computer-executable instructions associated with the system.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal languages of the claims.

What is claimed is:

1. A computer-implemented method for recommending items for future purchase by a consumer based on the consumer's historical actions, the method implemented using an adaptive recommendation ("AR") computer device comprising a memory, the method comprising:
receiving, from a recommender server computing device, at least one preference vector, wherein the at least one preference vector represents a purchasing pattern of a plurality of cardholders based on a first plurality of payment transactions corresponding to at least one item category, the first plurality of payment transactions from the plurality of cardholders;
storing, in the memory, the at least one preference vector;
receiving, for a candidate consumer, a plurality of consumer actions each including a time aspect, the plurality of consumer actions comprising a second plurality of payment transactions and a plurality of online actions, the second plurality of payment transactions from the candidate consumer, wherein the time aspect includes at least a time when each consumer action of the plurality of consumer actions occurred;
altering, by the AR computer device using at least one adaptive learning algorithm, the at least one preference vector based on the plurality of consumer actions;
determining, by the AR computer device, at least one personalized vector for the candidate consumer based on the altered at least one preference vector;
adjusting, by the AR computer device using the at least one adaptive learning algorithm, the at least one personalized vector such that more recent consumer actions of the plurality of consumer actions have a greater impact than less recent consumer actions of the plurality of consumer actions;
storing, in the memory, the adjusted at least one personalized vector;
synchronizing, by the AR computer device with at least one other AR computer device, the adjusted at least one personalized vector by transmitting the adjusted at least one personalized vector to the at least one other AR computer device such that the adjusted at least one personalized vector is stored within the at least one other AR computer device;
receiving, by the AR computer device, a deletion signal from a remote computer device associated with the candidate consumer;
deleting, from the memory of the AR computer device in response to the deletion signal, the at least one personalized vector;
restoring, from the at least one other AR computer device, the adjusted at least one personalized vector, wherein the adjusted at least one personalized vector has been further altered by actions performed on the at least one other AR computer device;

receiving, by the AR computer device, a plurality of local filters, the plurality of local filters including a current time, a current geographic information of the candidate consumer, and one or more recent consumer actions associated with the candidate consumer based on the current time;

applying, by the AR computer device, the plurality of local filters to the at least one personalized vector;

generating, by the AR computer device, at least one recommendation for a future purchase in the at least one item category based on the plurality of local filters applied to the at least one personalized vector; and displaying the at least one recommendation to the candidate consumer.

2. A method in accordance with claim 1, further comprising:

receiving a current time of day from the candidate consumer;

updating the at least one personalized vector by applying the current time of day to the at least one personalized vector; and displaying the at least one recommendation based on the current time of the day.

3. A method in accordance with claim 1, further comprising:

receiving a timing component included in the plurality of consumer actions, wherein the timing component updates the at least one personalized vector based on an amount of time since the plurality of consumer actions occurred.

4. A method in accordance with claim 1, further comprising:

displaying the at least one recommendation based on a current geographic location of the candidate consumer.

5. A method in accordance with claim 1, further comprising:

receiving transaction data for a payment transaction to purchase an item completed by the candidate consumer; and adjusting the at least one personalized vector based on the received transaction data.

6. A method in accordance with claim 5, further comprising preventing a display of the at least one recommendation to the candidate consumer based on the adjusted personalized vector in response to the transaction data.

7. A method in accordance with claim 1, further comprising:

receiving, from the recommender server computing device, a plurality of publisher-pushed recommendations, where each publisher-pushed recommendation is associated with a merchant paying to be listed as a recommendation; and ranking the plurality of publisher-pushed recommendations based on the at least one personalized vector.

8. A method in accordance with claim 7, further comprising:

determining, for each of the ranked plurality of publisher-pushed recommendations, a probability that the corresponding publisher-pushed recommendation is appropriate for the candidate consumer based on the at least one personalized vector;

comparing the probability for each of the ranked plurality of publisher-pushed recommendations with a predetermined threshold; and based on the comparison, displaying at least one of the plurality of publisher-pushed recommendations.

9. A method in accordance with claim 1, further comprising:

receiving, from a second AR computer device, at least one additional personalized vector for the candidate consumer;

updating the at least one personalized vector based on the at least one additional personalized vector; and transmitting, to the second AR computer device, the updated at least one personalized vector.

10. A method in accordance with claim 1, wherein the at least one personalized vector is only transmitted to the at least one other AR computer device associated with the candidate consumer.

11. An adaptive recommendation ("AR") computer device used for predicting future purchases of a consumer based on consumer action, said AR computer device comprising a memory device and a processor communicatively coupled to the memory device, said processor programmed to:

receive at least one preference vector from a recommender server computing device, wherein the at least one preference vector represents a purchasing pattern of a plurality of cardholders based on a first plurality of payment transactions corresponding to at least one item category, the first plurality of payment transactions from the plurality of cardholders;

store, in the memory device, the at least one preference vector;

receive, for a candidate consumer, a plurality of consumer actions each including a time aspect, the plurality of consumer actions comprising a second plurality of payment transactions and a plurality of online actions, the second plurality of payment transaction from the candidate consumer, wherein the time aspect includes at least a time when each consumer action of the plurality of consumer actions occurred;

alter, using at least one adaptive learning algorithm, the at least one preference vector based on the plurality of consumer actions;

determine at least one personalized vector for the candidate consumer based on the altered at least one preference vector;

adjust, using at least one adaptive learning algorithm, the at least one personalized vector such that more recent consumer actions of the plurality of consumer actions have a greater impact than less recent consumer actions of the plurality of consumer actions;

store, in the memory device, the adjusted at least one personalized vector;

synchronize, with at least one other AR computer device, the adjusted at least one personalized vector by transmitting the adjusted at least one personalized vector to the at least one other AR computer device such that the adjusted at least one personalized vector is stored within the at least one other AR computer device;

receive a deletion signal from a remote computer device associated with the candidate consumer;

delete, from the memory device in response to the deletion signal, the at least one personalized vector;

restore, from the at least one other AR computer device, the adjusted at least one personalized vector, wherein the adjusted at least one personalized vector has been further altered by actions performed on the at least one other AR computer device;

receive a plurality of local filters, the plurality of local filters including a current time, a current geographic information of the candidate consumer, and one or more recent consumer actions associated with the candidate consumer based on the current time;
apply the plurality of local filters to the at least one personalized vector;
generate at least one recommendation for a future purchase in the at least one item category based on the plurality of local filters applied to the at least one personalized vector; and
display the at least one recommendation to the candidate consumer.

12. An AR computer device in accordance with claim 11, wherein said processor is further configured to:
receive a current time of day from the candidate consumer;
update the at least one personalized vector by applying the current time of day to the at least one personalized vector; and
display the at least one recommendation based on the current time of the day.

13. An AR computer device in accordance with claim 11, wherein said processor is further configured to:
receive a timing component included in the plurality of consumer actions, wherein the timing component updates the at least one personalized vector based on an amount of time since the plurality of consumer actions occurred.

14. An AR computer device in accordance with claim 11, wherein said processor is further configured to:
display the at least one recommendation based on a current geographic location of the candidate consumer.

15. An AR computer device in accordance with claim 11, wherein said processor is further programmed to:
receive transaction data for a payment transaction to purchase an item completed by the candidate consumer; and
adjust the at least one personalized vector based on the received transaction data.

16. An AR computer device in accordance with claim 15, wherein said processor is further programmed to prevent a display of the at least one recommendation to the candidate consumer based on the adjusted personalized vector in response to the transaction data.

17. An AR computer device in accordance with claim 11, wherein said processor is further programmed to:
receive a plurality of publisher-pushed recommendations from the recommender server computing device, where each publisher-pushed recommendation is associated with a merchant paying to be listed as a recommendation; and
rank the plurality of publisher-pushed recommendations based on the at least one personalized vector.

18. An AR computer device in accordance with claim 17, wherein said processor is further programmed to:
determine, for each of the ranked plurality of publisher-pushed recommendations, a probability that the corresponding publisher-pushed recommendation is appropriate for the candidate consumer based on the at least one personalized vector;
compare the probability for each of the ranked plurality of publisher-pushed recommendations with a predetermined threshold; and
based on the comparison, display at least one of the plurality of publisher-pushed recommendations.

19. At least one non-transitory computer-readable storage media having computer-executable instructions embodied thereon, wherein when executed by an adaptive recommendation computer device having at least one memory device and at least one processor coupled to the at least one memory device, the computer-executable instructions cause the processor to:
receive at least one preference vector from a recommender server computing device, wherein the at least one preference vector represents a purchasing pattern of a plurality of cardholders based on a first plurality of payment transactions corresponding to at least one item category, the first plurality of payment transactions from the plurality of cardholders;
store, in the at least one memory device, the at least one preference vector;
receive, for a candidate consumer, a plurality of consumer actions each including a time aspect, the plurality of consumer actions comprising a second plurality of payment transactions and a plurality of online actions, the second plurality of payment transaction from the candidate consumer, wherein the time aspect includes at least a time when each consumer action of the plurality of consumer actions occurred;
alter, using at least one adaptive learning algorithm, the at least one preference vector based on the plurality of consumer actions;
determine at least one personalized vector for the candidate consumer based on the altered at least one preference vector;
adjust, using the at least one adaptive learning algorithm, the at least one personalized vector such that more recent consumer actions of the plurality of consumer actions have a greater impact than less recent consumer actions of the plurality of consumer actions;
store, in the at least one memory device, the adjusted at least one personalized vector;
synchronize, with at least one other AR computer device, the adjusted at least one personalized vector by transmitting the adjusted at least one personalized vector to the at least one other AR computer device such that the adjusted at least one personalized vector is stored within the at least one other AR computer device;
receive a deletion signal from a remote computer device associated with the candidate consumer;
delete, from the at least one memory device in response to the deletion signal, the at least one personalized vector;
restore, from the at least one other AR computer device, the adjusted at least one personalized vector, wherein the adjusted at least one personalized vector has been further altered by actions performed on the at least one other AR computer device;
receive a plurality of local filters, the plurality of local filters including a current time, a current geographic information of the candidate consumer, and one or more recent consumer actions associated with the candidate consumer based on the current time;
apply the plurality of local filters to the at least one personalized vector;
generate at least one recommendation for a future purchase in the at least one item category based on the plurality of local filters applied to the at least one personalized vector; and
display the at least one recommendation to the candidate consumer.

* * * * *